United States Patent
Chen et al.

(10) Patent No.: US 9,063,368 B2
(45) Date of Patent: Jun. 23, 2015

(54) DISPLAYING APPARATUS

(71) Applicant: AU Optronics Corp., Hsin-Chu (TW)

(72) Inventors: Shih-Chieh Chen, Hsin-Chu (TW);
Chih-Chuan Chang, Hsin-Chu (TW);
Yao-Chi Liu, Hsin-Chu (TW);
Shun-Chieh Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/645,520

(22) Filed: Oct. 5, 2012

(65) Prior Publication Data
US 2014/0043550 A1   Feb. 13, 2014

(30) Foreign Application Priority Data
Aug. 8, 2012  (TW) .............................. 101128558 A

(51) Int. Cl.
G02F 1/1333   (2006.01)
G02F 1/1335   (2006.01)

(52) U.S. Cl.
CPC ............. *G02F 1/133512* (2013.01); *G02F 2001/133388* (2013.01)

(58) Field of Classification Search
CPC .............. G02F 1/1335; G02F 1/1345; G02F 1/133615; G02F 1/133308; G02F 1/133514; G02B 6/0031; H04N 5/2257
USPC ................................ 349/58, 61–65, 106, 110
See application file for complete search history.

(56) References Cited

U.S. PATENT DOCUMENTS

| 6,803,975 B2 * | 10/2004 | Kim et al. ................. 349/43 |
| 7,701,526 B2 * | 4/2010 | Kim ........................... 349/54 |
| 8,248,557 B2 * | 8/2012 | Won et al. ................... 349/65 |
| 2006/0279207 A1 | 12/2006 | Kim |
| 2008/0297693 A1 * | 12/2008 | Lin et al. ................... 349/65 |

(Continued)

FOREIGN PATENT DOCUMENTS

| CN | 1877402 A | 12/2006 |
| CN | 102236182 A | 11/2011 |

(Continued)

OTHER PUBLICATIONS

Birendra Bahadur, Liquid Crystals Applications and Uses 1990, World Scientific, vol. 1, p. 193.*

*Primary Examiner* — Edward Glick
*Assistant Examiner* — David Chung
(74) *Attorney, Agent, or Firm* — Winston Hsu; Scott Margo

(57) ABSTRACT

A displaying apparatus includes a displaying panel, a back light device, and a structural frame fixing the both. The displaying panel includes a first substrate, a second substrate joined onto the first substrate, a light-masking structure, and a plurality of light modulation units. The light-masking structure and the light modulation units are disposed between the substrates. An edge of the second substrate is aligned with a corresponding edge of the first substrate. The light modulation units are disposed corresponding to a plurality of light-penetrating portions of the light-masking structure, for controlling whether light passes through the displaying panel to generate plane images. The light-masking structure wholly covers an edge portion including the edge of the second substrate. The displaying panel can directly use the light-masking structure to perform as a border frame for shielding the interior structure and light emitted from the interior without external covers or frames.

9 Claims, 8 Drawing Sheets

(56) References Cited

U.S. PATENT DOCUMENTS

2010/0110329 A1* 5/2010 Kubota et al. .................. 349/60
2011/0216264 A1* 9/2011 So et al. ......................... 349/61
2011/0261283 A1 10/2011 Kim

FOREIGN PATENT DOCUMENTS

| TW | I344571 | 7/2011 |
| TW | I350410 | 10/2011 |
| TW | 201137815 | 11/2011 |

* cited by examiner

US 9,063,368 B2

DISPLAYING APPARATUS

BACKGROUND OF THE INVENTION

1. Field of the Invention

The invention relates to a displaying panel and a displaying apparatus, and especially relates to a displaying panel using a light-masking structure for separating pixels and a displaying apparatus having the displaying panel.

2. Description of the Prior Art

Current widely-used displaying apparatuses are usually designed with active light source, liquid crystal display for example. The back light therefor is emitted from below the liquid crystal panel to generate images. The liquid crystal display is usually based on modular design, so the structure and function for every component is just designed for its function requirement leading to the liquid crystal display requiring many individual components for satisfying its whole specification requirement. In the configuration of the current liquid crystal display for example, the back light module is in charge mainly of providing back light. The liquid crystal panel is in charge mainly of controlling whether the back light passes through to generate required color light for each pixel. The structural frame is in charge of connecting, supporting, and fixing related or close disposed components. The appearance decoration part is in charge of providing an appearance visual effect for the whole apparatus. The modular design is contributive to simplifying product design and increase reuse rate of design, but the amount of the components is hard to be reduced leading to difficulty in reducing product volume. Furthermore, the assembly of the components usually unavoidably involve seam or step therebetween so that the product appearance hardly provides a visual effect of integral whole to users.

SUMMARY OF THE INVENTION

An objective of the invention is to provide a displaying panel, which uses a light-masking structure in its structure to provide a structure for efficient masking light for the displaying panel, so that an apparatus having the displaying panel can use less or even not use additional light-masking components for reducing the volume of the apparatus.

The displaying panel of the invention has a displaying direction and includes a first substrate, a second substrate, a light-masking structure, and a plurality of light modulation units. The first substrate has a first edge. The second substrate is joined onto the first substrate in the displaying direction. The second substrate has a second edge and an edge portion including the second edge. The second edge is aligned with or beyond the first edge. The light-masking structure is disposed between the first substrate and the second substrate. The light-masking structure wholly covers the edge portion in the displaying direction and has a plurality of light-penetrating portions. The light modulation units are disposed between the first substrate and the second substrate corresponding to the light-penetrating portions, for individually controlling light selectively emitting out of the second substrate in the displaying direction to generate plane images. In an embodiment, the displaying panel can be a liquid crystal panel. The light-masking structure is a black matrix inside the structure of the liquid crystal panel and is usually used for separating filter areas in different colors. However, the invention is not limited thereto. Therefore, in the configuration of the displaying panel of the invention, the light-masking structure extends till the edge of the second substrate, so as to efficiently shield circuits on the first substrate or other components and structures and also to be conducive to reduction of light leakage of the displaying panel to a certain extent. Therefore, an apparatus using this displaying panel can use less additional light-masking components so as to reduce the volume of the apparatus.

Another objective of the invention is to provide a displaying apparatus. The displaying apparatus has the displaying panel of the invention so as to use less or even not use additional light-masking components, which facilitates volume control and appearance design of the displaying apparatus.

The displaying apparatus of the invention includes a displaying panel, a back light device, and a structural frame. The displaying panel has a displaying direction and includes a first substrate, a second substrate, a light-masking structure, and a plurality of light modulation units. The first substrate has a first edge. The second substrate is joined onto the first substrate in the displaying direction. The second substrate has a second edge and an edge portion including the second edge. The second edge is aligned with or beyond the first edge. The light-masking structure is disposed between the first substrate and the second substrate. The light-masking structure wholly covers the edge portion in the displaying direction and has a plurality of light-penetrating portions. The light modulation units are disposed between the first substrate and the second substrate corresponding to the light-penetrating portions, for individually controlling light selectively emitting out of the second substrate in the displaying direction to generate plane images. The back light device is disposed below the displaying panel in the displaying direction, for providing the light. The structural frame is used for fixing the displaying panel and the back light device. The structural frame has a side surface. The second edge of the second substrate of the displaying panel is near or aligned with the side surface. Similarly, in the configuration of the displaying panel of the displaying apparatus, the light-masking structure extends till the edge of the second substrate, so as to efficiently shield circuits on the first substrate or other components, structures and partial structure (especially non-lighting components) of the back light device and also to reduce using additional light-masking components to reduce the volume of the displaying apparatus. Furthermore, the light-masking structure extends substantially near the side surface of the structural frame, so that from a top view in the displaying direction of the displaying panel, the profile of the displaying panel is almost regarded as the profile of the displaying apparatus. The light-masking structure then can be regarded as a border of the displaying apparatus, which improves flexibility of the appearance design of the displaying apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
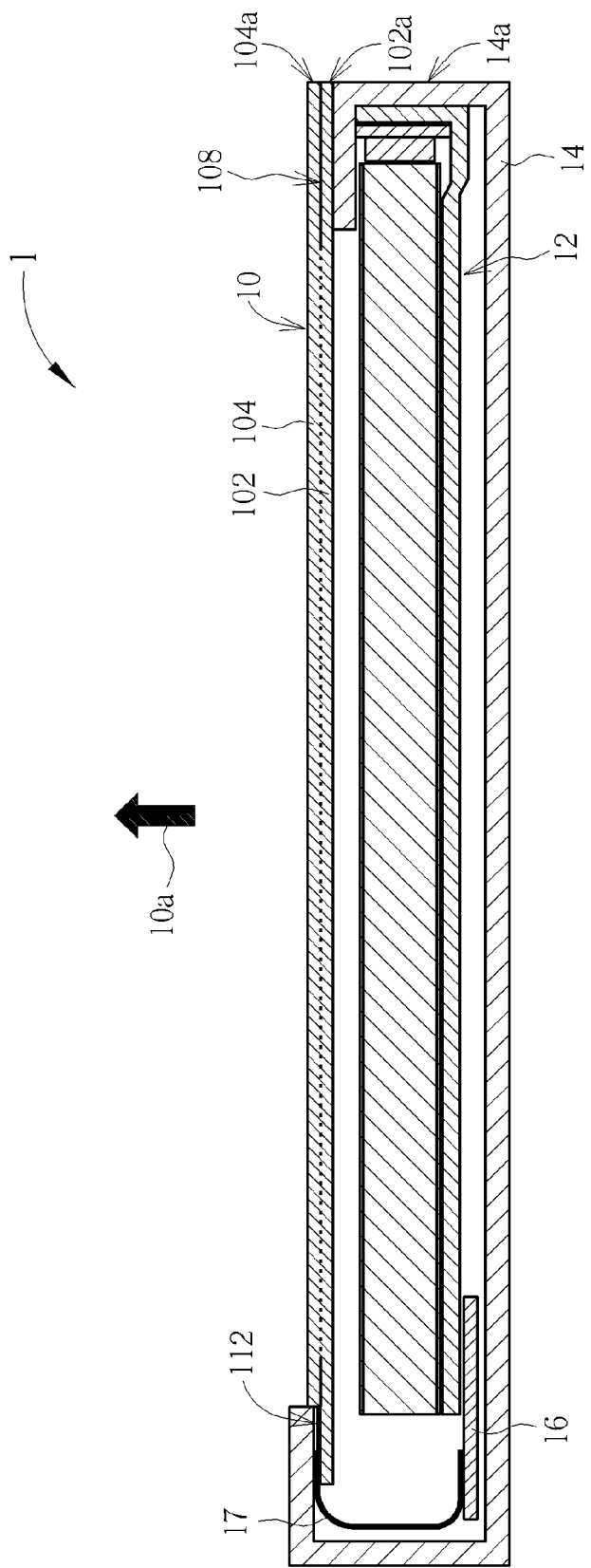
FIG. 1 is a sectional view of a displaying apparatus of a preferred embodiment according to the invention.

Please refer to FIG. 1, which is a sectional view of a displaying apparatus 1 of a preferred embodiment according to the invention. The displaying apparatus 1 includes a displaying panel 10, a back light device 12, a structural frame 14, and a control module 16. The displaying panel 10 has a displaying direction 10a. The back light device 12 is disposed below the displaying panel 10 in the displaying direction 10a, for providing required light for the displaying panel 10. The structural frame 14 is used for fixing the displaying panel 10 and the back light device 12. The displaying panel 10 is capable of selectively controlling the light produced by the back light device 12 to pass through to generate plane images. It is added that, in practice, the displaying apparatus 1 can be applied to but not limited to smart phones, displays and other electronic apparatus having function of displaying images. For different electronic apparatus, there may be other electronic components involved, which is known by people ordinarily skilled in the art and is not described in details. For simple illustration, in the specification, the figures only show components directly relevant to the technique features of the invention.

Figure 2:
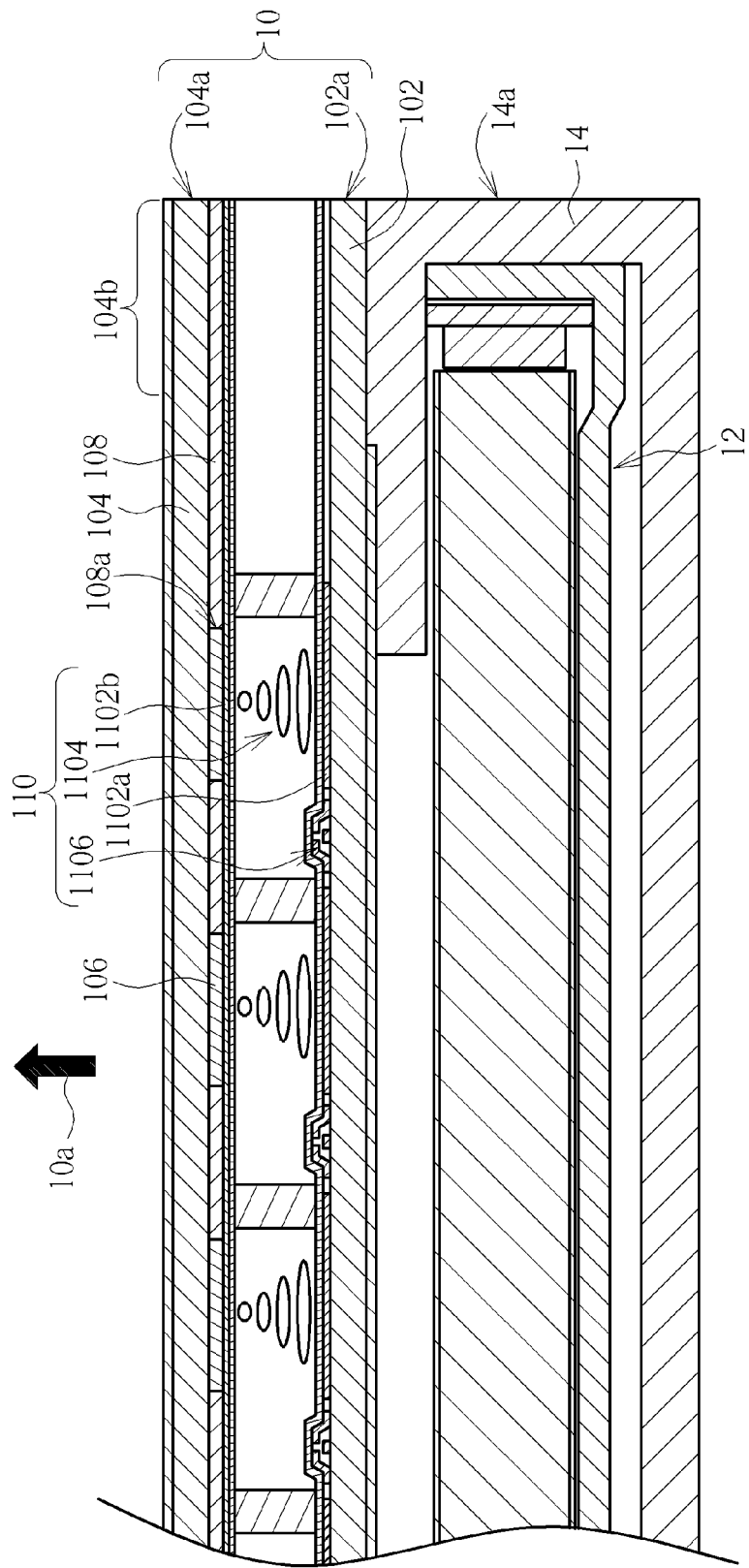
FIG. 2 is an enlarged sectional view of a part of the displaying apparatus in FIG. 1.

Please also refer to FIG. 2. FIG. 2 is an enlarged sectional view of a part of the displaying apparatus 1; therein, the interior structure of the displaying panel 10 is shown to be exaggerated. Further, the displaying panel 10 includes a first substrate 102, a second substrate 104, an optical filter structure 106, a light-masking structure 108, and a plurality of light modulation units 110. The first substrate 102 has a first edge 102a. The second substrate 104 is joined onto the first substrate 102 in the displaying direction 10a. The second substrate 104 has a second edge 104a and includes an edge portion 104b including the second edge 104a. The second edge 104a is aligned with the first edge 102a. The light-masking structure 108 is disposed between the first substrate 102 and the second substrate 104. The light-masking structure 108 wholly covers the edge portion 104b in the displaying direction 10a and has a plurality of light-penetrating portions 108a. The optical filter structures 106 are disposed between the first substrate 102 and the second substrate 104 corresponding to light-penetrating portions 108a. The light modulation units 110 are disposed between the first substrate 102 and the second substrate 104 corresponding to the light-penetrating portions 108a and electrically connected to the control module 16 by a connection circuit 112 formed on the first substrate 102 and a flexible flat cable 17. Therefore, the control module 16 uses the light modulation units 110 to individually control the light produced by the back light device 12 selectively emitting out of the second substrate 104 in the displaying direction 10a to generate plane images. The structural frame 14 has a side surface 14a. The second edge 104a of the second substrate 104 of the displaying panel 10 is aligned with the side surface 14a.

In the embodiment, the displaying panel 10 is a liquid crystal panel. The optical filter structure 106 is used for produce different color lights, such as red light, green light, and blue light. The light modulation units 110 are realized on the basis of light penetration mechanism of liquid crystal; however, the invention is not limited thereto. In the embodiment, the optical filter structure 106 is formed on the second substrate 104. The light-masking structure 108 is the black matrix for the liquid crystal panel and is also formed on the second substrate 104 capable of dividing the optical filter structure 106 into a plurality of color areas. In logic, the light modulation unit 110 includes two electrodes 1102a and 1102b formed on the first substrate 102 and the second substrate 104 respectively, a liquid crystal 1104 disposed between the electrodes 1102a and 1102b, and a semiconductor switch 1106 formed on the first substrate 102 and electrically connected to the electrodes 1102a and 1102b. In practice, the electrodes 1102b are taken as a single common electrode. The electrodes 1102a and the semiconductor switches 1106 are realized by forming a thin-film-transistor matrix on the first substrate 102. The electrodes 1102a function as cell electrodes and are controlled by corresponding semiconductor switches 1106. The liquid crystal 1104 is filled between the first substrate 102 and the second substrate 104. Spacers are involved to maintain a distance between the first substrate 102 and the second substrate 104. Other descriptions of the structure and operation mechanism of the liquid crystal panel are known by people ordinarily skilled in the art and are not described in further details.

In the embodiment, because the light-masking structure 108 covers the edge portion 104b wholly; that is, the interior structure of the displaying panel 10 at the first edge 102a or the second edge 104a is efficiently shielded by the light-masking structure 108. So, in logic, additional border is needless for shielding. For users, the light-masking structure 108 at the first edge 102a or the second edge 104a can also function as a border, where the surface of the displaying apparatus 1 can be kept smooth and continuous, which is conducive to beauty appearance of the displaying apparatus 1. In addition, in the embodiment, the first substrate 102 is directly attached onto the structural frame 14. Because the displaying panel 10 usually includes a polarizing sheet on the first substrate 102, the structural frame 14 can be formed with a step structure in coordination with the polarizing sheet, so as to improve the sealability and junction strength of the displaying panel 10 with the structural frame 14.

Figure 3:
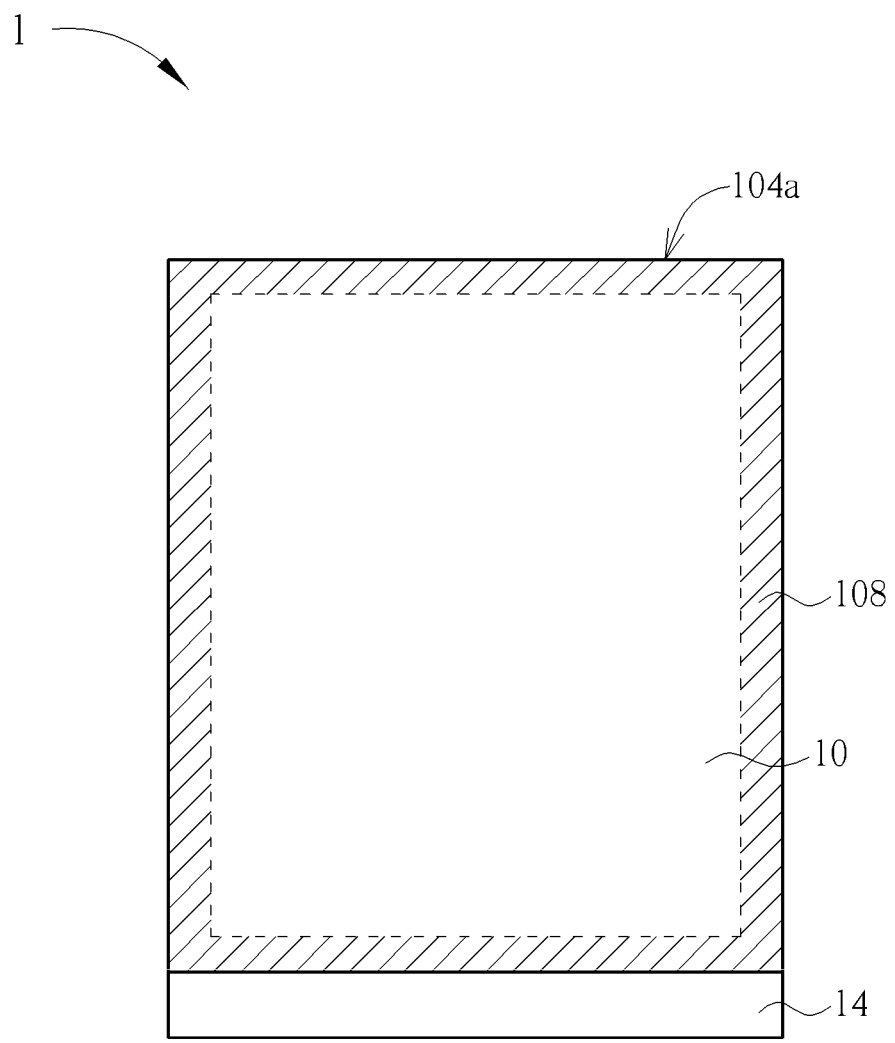
FIG. 3 is a top view of the displaying apparatus in FIG. 1.
Figure 4:
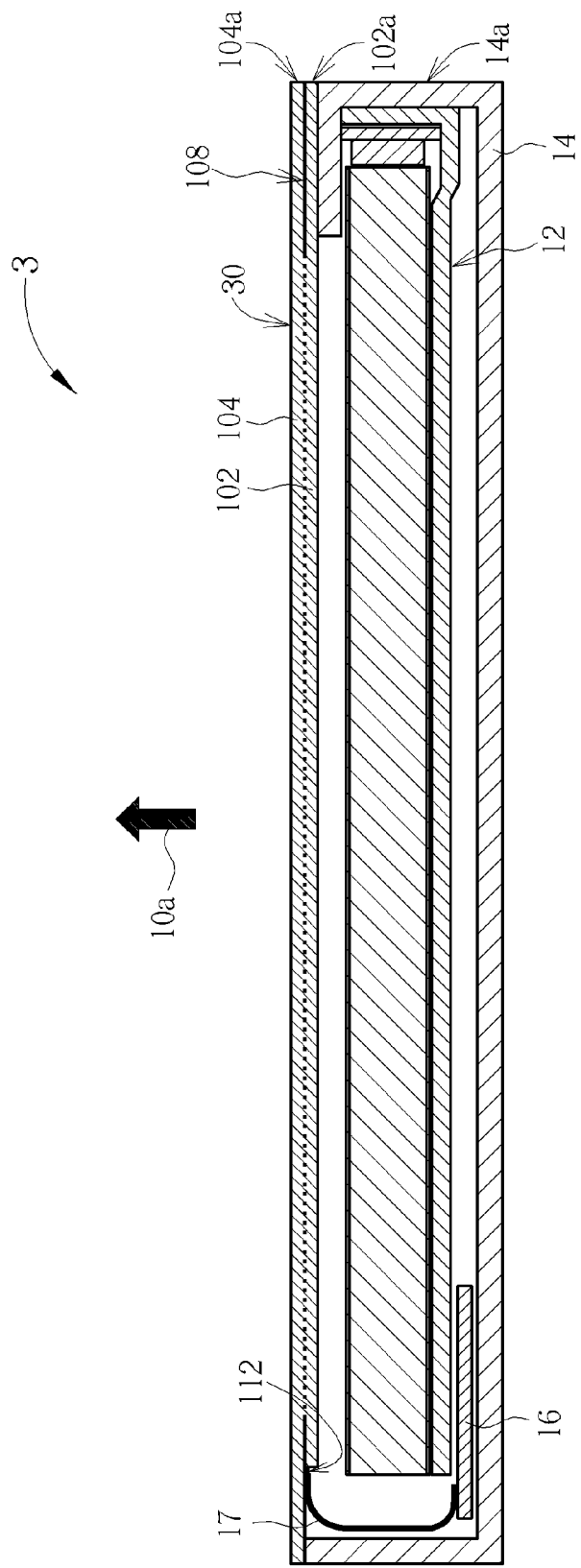
FIG. 4 is a sectional view of a displaying apparatus according to another embodiment.
Figure 5:
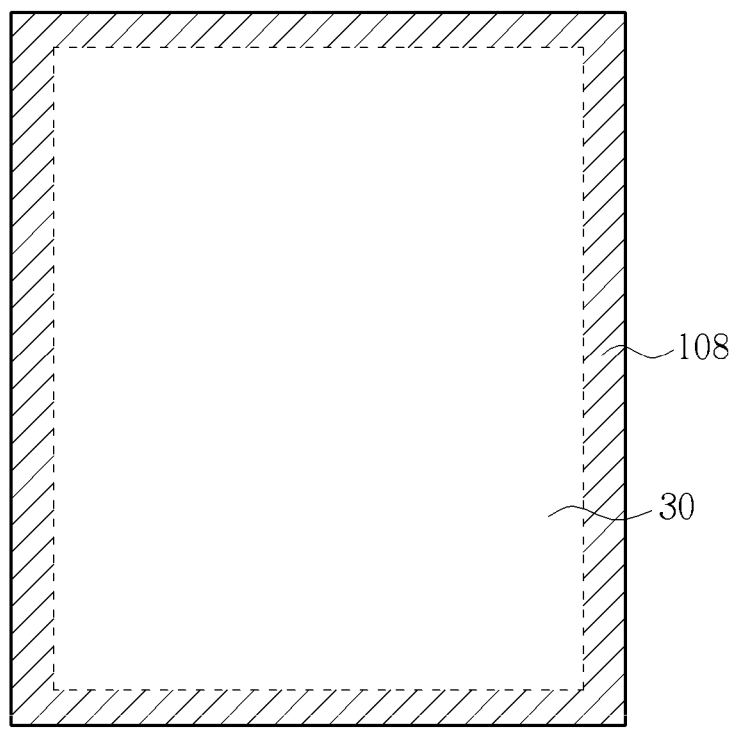
FIG. 5 is a top view of the displaying apparatus in FIG. 4.

In the embodiment, the semiconductor switch 1106 is disposed on the first substrate 102. The connection circuit 112 is also formed on the first substrate 102. For the convenience of electrically connecting the control module 16 and the light modulation units 110, the connection circuit 112 needs to be relatively exposed out of the second substrate 104, that is, where the second substrate 104 does not cover the first substrate 102. Therefore, in a practical product design, the displaying panel 10 can be disposed to be aligned with the structural frame 14 at most three sides of the structural frame 14, as shown by FIG. 3. Therein, the border effect by the light-masking structure 108 in the displaying panel 10 is indicated by hatched lines in the figure. However, the invention is not limited thereto. Please refer to FIG. 4, which is a sectional view of a displaying apparatus 3 according to another embodiment. In the embodiment, a displaying panel 30 of the displaying apparatus 3 is similar in structure to the displaying panel 10 of the displaying apparatus 1. The main difference is that in the embodiment, the connection circuit 112 is formed on the second substrate 104, and the semiconductor switch 1106 on the first substrate 102 can be electrically connected to the connection circuit 112 by an anisotropic conductive film. In such case, the connection circuit 112 is relatively exposed out of the first substrate 102. The second substrate 104 then covers the whole first substrate 102. The circumference of the second substrate 104 can be totally aligned with the outer side surface of the structural frame 14, so that the top view of the displaying apparatus 3 almost shows only the displaying panel 30. Therefore, the displaying apparatus 3 can provide users a full flat screen with visual effect of seamless and integral whole, as shown by FIG. 5.

Therein, the border effect by the light-masking structure 108 in the displaying panel 30 is indicated by hatched lines in the figure. It is added that, in practice, the second substrate 104 can be beyond the edge of the first substrate 102; that is, the second edge 104a is beyond the first edge 102a. Thereby, it is convenient to design the width of the border formed by the light-masking structure 108.

Figure 6:
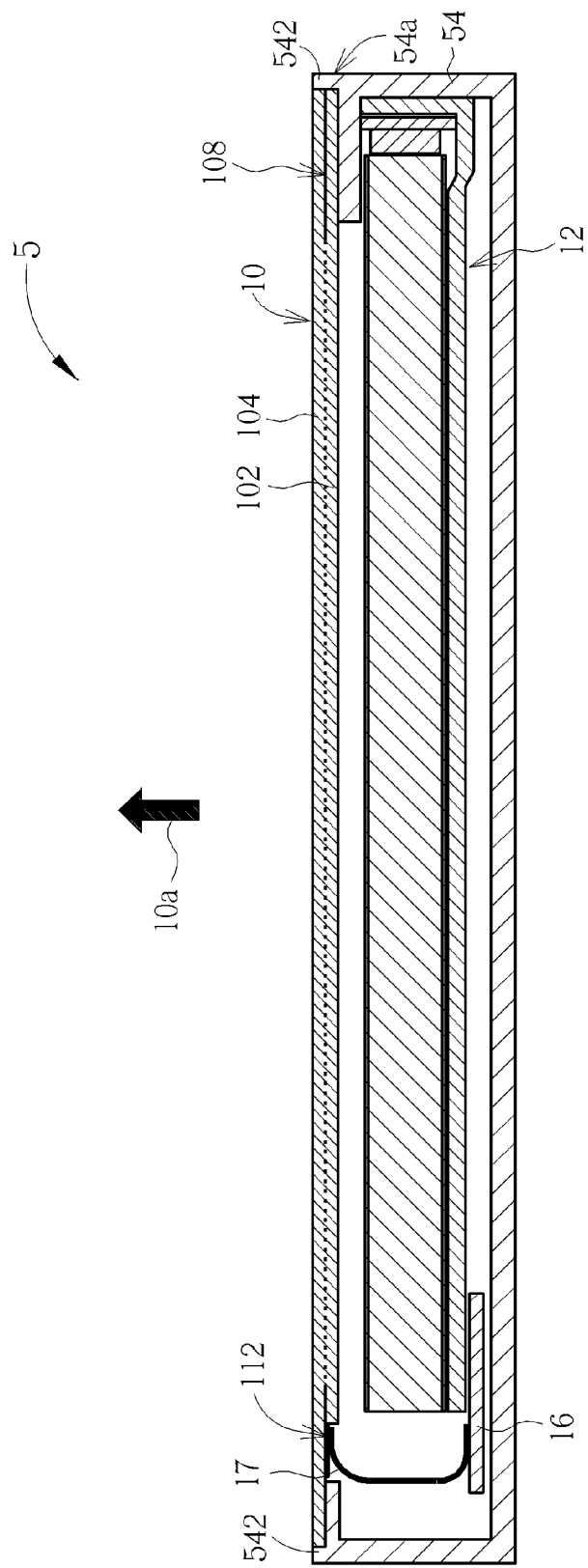
FIG. 6 is a sectional view of a displaying apparatus according to another embodiment.
Figure 7:
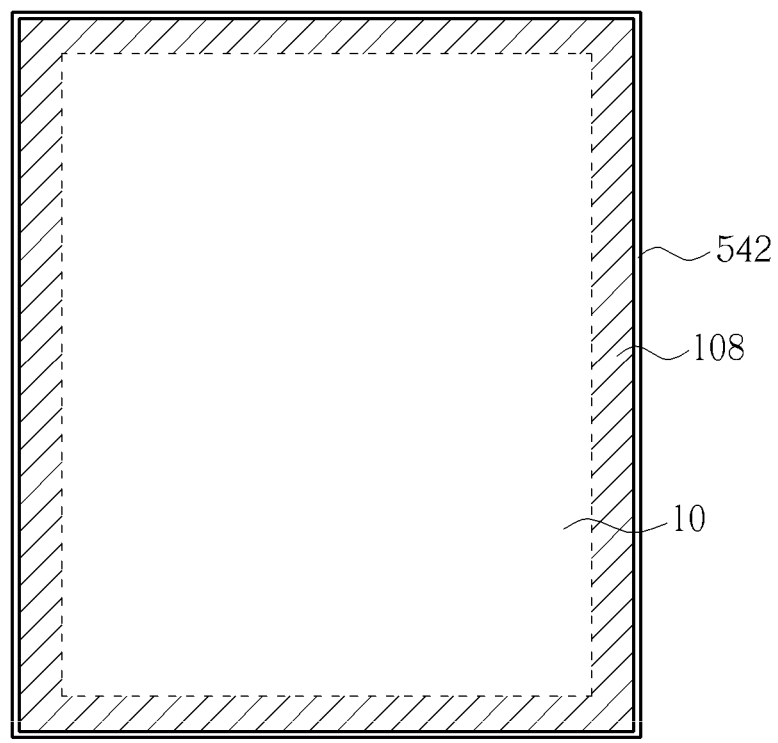
FIG. 7 is a top view of the displaying apparatus in FIG. 6.

In the above embodiments, if it is considered that light may leak out at the edges of the displaying panels 10 and 30, in practice, the edges of the displaying panels 10 and 30 can be coated with layers for absorbing light, but the invention is not limited thereto. Please refer to FIG. 6, which is a sectional view of a displaying apparatus 5 according to another embodiment. The displaying apparatus 5 is similar in structure to the displaying apparatus 3. The main difference is that a structural frame 54 of the displaying apparatus 5 includes a protrusive side wall 542. The side wall 542 includes a side surface 54a of the structural frame 54. The second edge 104a of the second substrate 104 contacts the side wall 542. In such case, the second edge 104a of the second substrate 104 is just near to, not aligned with the side surface 54a. In the configuration of the displaying apparatus 5, the side wall 542 has the function of absorbing light as the light-absorbing layers; besides, the side wall 542 is conducive to the disposition of the displaying panel 10 and the structural strength of the whole displaying apparatus 5. Furthermore, the second substrate 104 of the displaying apparatus 5 covers the whole first substrate 102, so in the embodiment, the protrusive side wall 542 can surround the circumference of the second substrate 104. As shown by the top view of the displaying apparatus 5 in FIG. 7, when the thickness of the side wall 542 is thin relative to the displaying panel 10, the displaying apparatus 5 can still provide users a visual effect of full flat screen. Furthermore, the side wall 542 can provide users an effect of decorating the fringe of the displaying panel 10. Therein, the border effect by the light-masking structure 108 in the displaying panel 10 is indicated by hatched lines in the figure.

Figure 8:
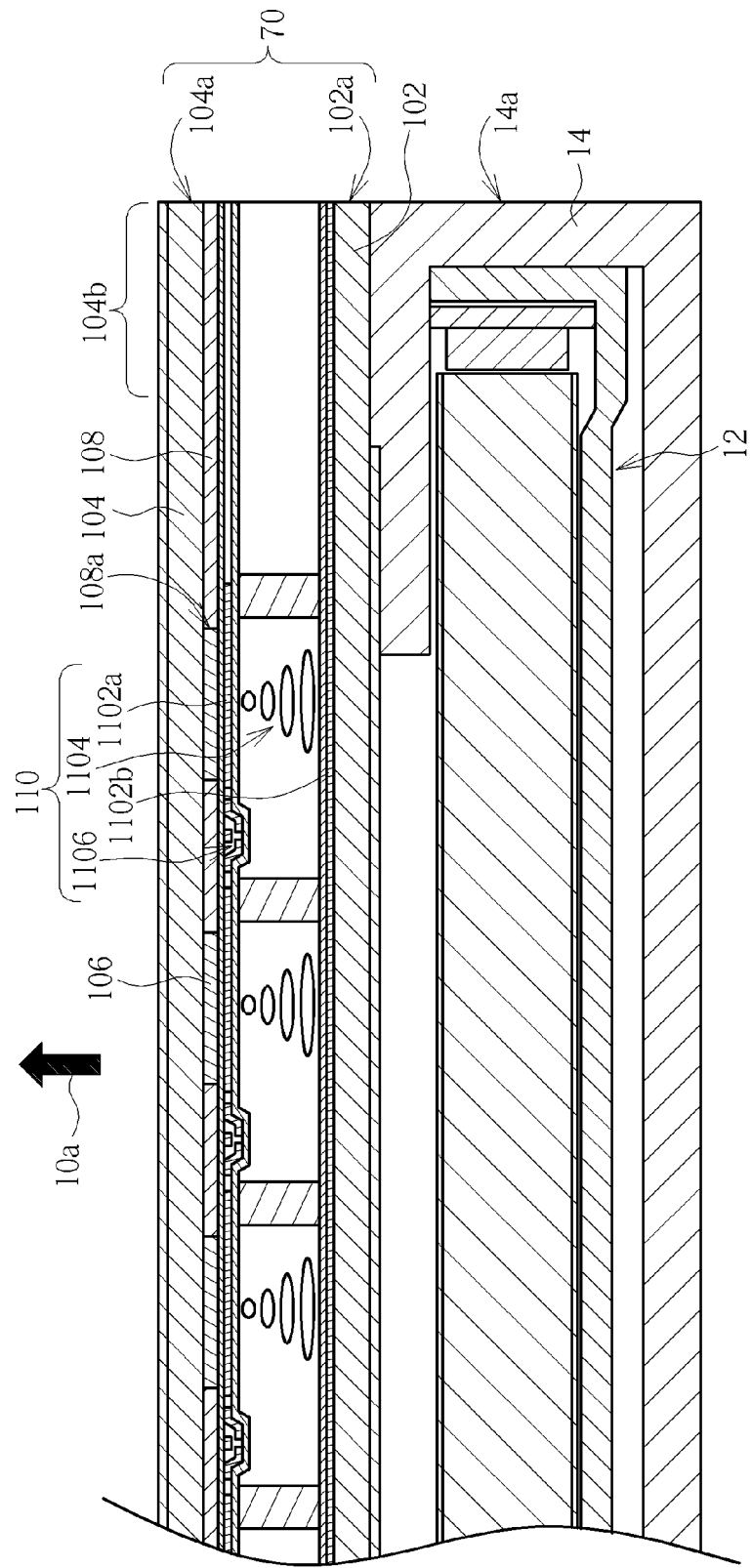
FIG. 8 is a sectional view of a displaying apparatus according to another embodiment.

In the above embodiment, the semiconductor switch 1106 and the optical filter structure 106 are disposed on the first substrate 102 and the second substrate 104 respectively, but the invention is not limited thereto. Please refer to FIG. 8, which is a sectional view of a displaying panel 70 according to another embodiment. In the embodiment, the semiconductor switches 1106 of the light modulation units 110 are formed on the optical filter structure 106 and the light-masking structure 108. The connection circuit 112 of the displaying panel 70 is also formed directly on the second substrate 104. Thereby, the second substrate 104 can be structurally designed to cover the whole first substrate 102, so as to obtain the effect of full flat screen. For example, the displaying panel 70 replaces the displaying panel 30 to be used in the displaying apparatus 3 shown in FIG. 4.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A displaying apparatus, comprising:
a displaying panel having a one side and a second side opposite the one side and comprising:
a first substrate;
a second substrate disposed on the first substrate and covering the whole first substrate, the second substrate being aligned with the first substrate at the one side, the second substrate being beyond the first substrate at the second side and having a protruding portion;
a light-masking structure located between the first substrate and the second substrate and having a plurality of light-penetrating portions;
a plurality of light modulation units disposed between the first substrate and the second substrate corresponding to the light-penetrating portions, for individually controlling light selectively emitting out of the second substrate in a displaying direction to generate plane images; and
a connection circuit formed on the protruding portion at the second side and electrically connected to a semiconductor switch of each light modulation unit on the first substrate;
a back light device disposed below the displaying panel, the back light device comprising a light source module at the one side; and
a structural frame surrounding the back light device and supporting the one side and the second side of the displaying panel, the structural frame supporting the first substrate and the protruding portion of the second substrate, the structural frame having a side surface, an edge of the second substrate being near or aligned with the side surface;
wherein a projection of the light-masking structure in the displaying direction covers the connection circuit and portions of the structural frame supporting the first substrate and the second substrate.

2. The displaying apparatus of claim 1, wherein the displaying panel further comprises an optical filter structure, formed on the second substrate corresponding to the light-penetrating portions.

3. The displaying apparatus of claim 2, wherein the light modulation unit comprises two electrodes formed on the first substrate and the second substrate respectively and a liquid crystal disposed between the two electrodes, and the semiconductor switch is electrically connected to the two electrodes.

4. The displaying apparatus of claim 3, wherein the light-masking structure is formed on the second substrate.

5. The displaying apparatus of claim 2, wherein the light modulation unit comprises two electrodes formed on the first substrate and the optical filter structure respectively and a liquid crystal disposed between the two electrodes, the semiconductor switch is electrically connected to the two electrodes, and the light-masking structure is formed on the second substrate.

6. The displaying apparatus of claim 1, wherein the displaying panel further comprises a control module, and the control module is electrically connected to the light modulation units by the connection circuit.

7. A displaying apparatus, comprising:
a displaying panel having a one side and a second side opposite the one side and comprising:
a first substrate;
a second substrate disposed on the first substrate and covering the whole first substrate, the second substrate being aligned with the first substrate at the one side, the second substrate being beyond the first substrate at the second side and having a protruding portion;
a light-masking structure located between the first substrate and the second substrate and having a plurality of light-penetrating portions;

a plurality of light modulation units disposed between the first substrate and the second substrate corresponding to the light-penetrating portions, for individually controlling light selectively emitting out of the second substrate in a displaying direction to generate plane images; and a connection circuit formed on the protruding portion at the second side and electrically connected to a semiconductor switch of each light modulation unit on the first substrate;

a back light device disposed below the displaying panel, the back light device comprising a light source module at the one side; and a structural frame surrounding the back light device and supporting the one side and the second side of the displaying panel, the structural frame supporting the first substrate and the protruding portion of the second substrate, the structural frame having a protrusive side wall, an edge of the second substrate being against the protrusive side wall, the protrusive side wall extending in the displaying direction without beyond a top surface of the second substrate;

wherein a projection of the light-masking structure in the displaying direction covers the connection circuit.

8. The displaying apparatus of claim 7, wherein an extension end surface of the protrusive side wall is horizontal co-planar with the top surface in the displaying direction.

9. The displaying apparatus of claim 7, wherein an extension end of the protrusive side wall is aligned with the top surface in the displaying direction.

* * * * *